United States Patent
Ishimaru et al.

(10) Patent No.: US 7,654,232 B2
(45) Date of Patent: Feb. 2, 2010

(54) HYDROGEN ENGINE SYSTEM

(75) Inventors: Hirotoshi Ishimaru, Hitachinaka (JP);
Tetsuro Miyamoto, Kasumigaura (JP);
Takao Ishikawa, Hitachi (JP); Atsushi Shimada, Hitachinaka (JP); Masatoshi Sugimasa, Tokai (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 11/866,464

(22) Filed: Oct. 3, 2007

(65) Prior Publication Data
US 2008/0110420 A1 May 15, 2008

(30) Foreign Application Priority Data
Apr. 10, 2006 (JP) ............................. 2006-272400

(51) Int. Cl.
*F02G 5/00* (2006.01)
*F02B 43/10* (2006.01)

(52) U.S. Cl. ............... 123/3; 123/557; 123/DIG. 12

(58) Field of Classification Search ............ 123/1 A, 123/3, 198 A, 557, DIG. 12, 27 GE, 525, 123/527, 536, 543
See application file for complete search history.

(56) References Cited

U.S. PATENT DOCUMENTS

| | | | | |
|---|---|---|---|---|
| 4,318,369 A | * | 3/1982 | Cronyn | 123/3 |
| 4,520,764 A | * | 6/1985 | Ozawa et al. | 123/3 |
| 6,186,126 B1 | * | 2/2001 | Gray, Jr. | 123/557 |
| 7,434,547 B2 | * | 10/2008 | Clawson | 123/3 |
| 7,448,348 B2 | * | 11/2008 | Shinagawa et al. | 123/3 |
| 7,578,911 B2 | * | 8/2009 | Nweke | 204/266 |
| 7,587,998 B2 | * | 9/2009 | Hotta et al. | 123/3 |
| 2006/0204799 A1 | * | 9/2006 | Ishikawa et al. | 429/19 |
| 2009/0241861 A1 | * | 10/2009 | Sano et al. | 123/3 |

FOREIGN PATENT DOCUMENTS

| | | | |
|---|---|---|---|
| JP | 2005-22939 | * | 1/2005 |
| JP | 2005126315 | | 5/2005 |
| JP | 2005147124 | | 6/2005 |
| JP | 2006248814 | | 9/2006 |
| JP | 2007091035 | | 4/2007 |
| JP | 2008-88922 | * | 4/2008 |

* cited by examiner

*Primary Examiner*—Hai H Huynh
(74) *Attorney, Agent, or Firm*—Antonelli, Terry, Stout & Kraus, LLP.

(57) ABSTRACT

A hydrogen engine system for driving an engine with hydrogen gases as a fuel comprises a hydrogenated liquid fuel tank, which holds a hydrogenated liquid fuel in a liquid phase, a preheater, to which the hydrogenated liquid fuel and a dehydrogenated fuel from the hydrogen feed unit are transported and which preheats the hydrogenated liquid fuel owing to heat exchange, a vaporizer, to which the hydrogenated liquid fuel as preheated and exhaust gases of the engine are transported and which heats the hydrogenated liquid fuel to put the same in a vapor phase, and a hydrogen feed unit, to which the hydrogenated liquid fuel as vaporized and exhaust gases of the engine are transported and which generates hydrogen gases owing to dehydrogenation to transport the same to the engine.

10 Claims, 4 Drawing Sheets

HYDROGEN ENGINE SYSTEM

BACKGROUND OF THE INVENTION

The present invention relates to a hydrogen engine system, and more particular, to a hydrogen engine system on which a medium for generating hydrogen from organic hydride owing to dehydrogenation is mounted.

In a situation, in which global warming is becoming serious due to carbon dioxide, etc., attention is paid to hydrogen as an energy source, which bears the next generation in place of fossil fuel. It has been studied how to construct those systems for transportation, storage, and feeding of hydrogen, which are essential in using hydrogen as a fuel. That is, hydrogen is gaseous at room temperature and so difficult to store and transport as compared with liquids and solids. Besides, hydrogen is a combustible substance to involve a danger of explosion when mixed with an air at a predetermined mixing ratio. Therefore, as described in, for example, JP-A-2005-126315, it is known that a planar flow passage, a catalyst layer, hydrogen separation means, and a flow port are formed integrally in a dispersed power source and a small-sized, efficient hydrogen storage/feed unit used in automobiles.

Also, as described in, for example, JP-A-2005-147124, it is known that in a system for driving of an engine using hydrogen gases generated from a medium, which generates hydrogen from a conventional, organic hydride owing to dehydrogenation, as a fuel, hydrogen-rich gases are separated from organic hydride (referred to as hydrogenated fuel) and fed to an internal combustion engine such as gasoline engine, diesel engine, hydrogen engine, etc.

The unit described in JP-A-2005-126315 is difficult to generate a large amount of hydrogen gases and so can neither reduce $CO_2$ discharge as far as possible in an engine of an automobile nor discharge $CO_2$. Also, the system described in JP-A-2005-147124 discharges $CO_2$ when gasoline or hydrogenated gasoline is fed as a fuel to an engine.

Further, dehydrogenation of organic hydride such as methylcyclohexane, decalin, etc. is an endothermic reaction (68 kJ/mol) and reaction temperature is as high as 250° C. or higher, so that a whole system becomes large in size since an electric source must be mounted separately when a heater or the like is used to heat a dehydrogenation reactor.

SUMMARY OF THE INVENTION

It is an object of the invention to solve the problems in the related art to efficiently generate a large amount of hydrogen gases and to achieve miniaturization of a whole system to make the same appropriate for installing on an automobile and for use as a power source such as cogeneration, combined system, various power plants, boiler facility, etc.

In order to solve such problems, the invention provides a hydrogen engine system including a hydrogen feed unit, which generates hydrogen from organic hydride owing to dehydrogenation, and driving an engine with hydrogen gases as a fuel, the hydrogen engine system comprising: a hydrogenated liquid fuel tank, which holds a hydrogenated liquid fuel in a liquid phase; a preheater, to which the hydrogenated liquid fuel and a dehydrogenated fuel from the hydrogen feed unit are transported and which preheats the hydrogenated liquid fuel owing to heat exchange; an vaporizer, to which the hydrogenated liquid fuel as preheated and exhaust gases of the engine are transported and which heats the hydrogenated liquid fuel to put the same in a vapor phase; and the hydrogen feed unit, to which the hydrogenated liquid fuel as vaporized and exhaust gases of the engine are transported and which generates hydrogen gases owing to dehydrogenation to transport the same to the engine.

According to the invention, a hydrogenated liquid fuel is preheated by a dehydrogenated fuel from the hydrogen feed unit and vaporized making use of exhaust gases of an engine to generate hydrogen gases, so that it is possible to generate a large amount of hydrogen gases efficiently and to make a whole system small in size.

Other objects, features and advantages of the invention will become apparent from the following description of the embodiments of the invention taken in conjunction with the accompanying drawings.

DESCRIPTION OF THE PREFERRED EMBODIMENT

Figure 1:
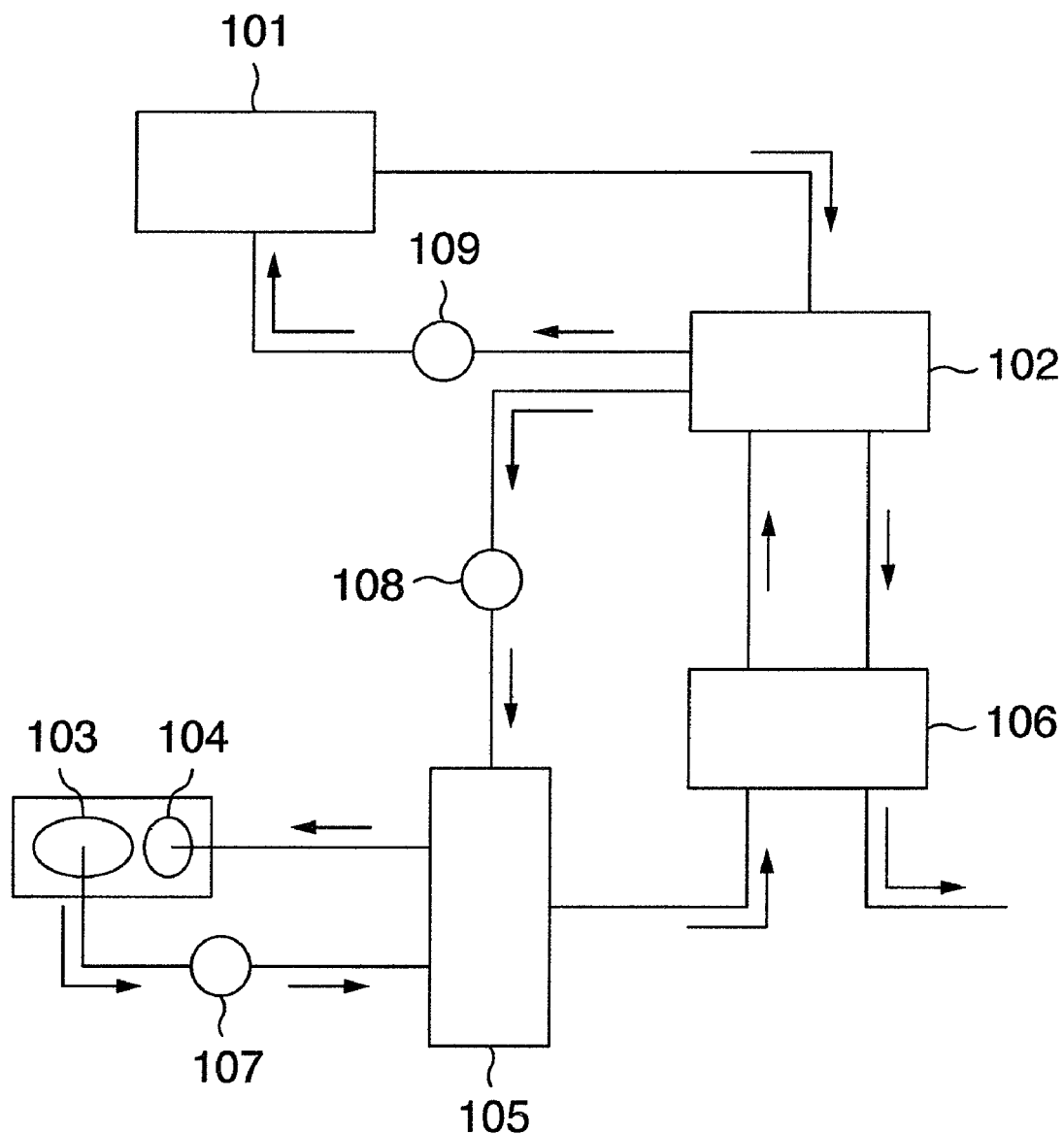
FIG. 1 is a block diagram of a hydrogen engine system according to an embodiment of the invention.

FIG. 1 shows an outline of a hydrogen engine system according to an embodiment, and the hydrogen engine system comprises: an engine 101, in which hydrogen gases are used as a fuel; a hydrogen feed unit 102, in which hydrogen is generated from organic hydride owing to dehydrogenation; a hydrogenated liquid fuel tank 103, which holds a hydrogenated liquid fuel; a dehydrogenated fuel tank 104; a preheater 105, which preheats the hydrogenated liquid fuel; an vaporizer 106 for vaporization of the preheated hydrogenated liquid fuel; pumps (107, 108, 109) for transportation of a hydrogenated liquid fuel, a fuel after dehydrogenation, hydrogen gases, respectively; and a piping for transportation, etc.

Arrows in the drawing indicate directions, in which a hydrogenated liquid fuel, a fuel after dehydrogenation, hydrogen gases, and exhaust gases are transported. The hydrogenated liquid fuel comprises a hydrocarbon fuel such as gasoline, light gas oil, kerosine, heavy fuel oil, decalin, cyclohexane, methylcyclohexane, naphthalene, benzene, and toluene, a mixed fuel thereof, peroxide, ammonia, nitrogen, oxygen, etc., which can store/emit hydrogen chemically.

A description will be given below assuming that the hydrogenated liquid fuel is methylcyclohexane.

Methylcyclohexane held in a liquid phase in the hydrogenated liquid fuel tank 103 at room temperature is transported to the preheater 105 by the pump 107. A dehydrogenated fuel, that is, toluene is transported to the preheater 105 from the hydrogen feed unit 102 by the pump 108. Heat exchange is performed by a temperature difference between the both media transported to the preheater 105, so that methylcyclohexane is preheated. At this time, the temperature of toluene is 250° C. or lower. In order to recover a large quantity of heat from toluene, the preheater 105 is preferably arranged close to the hydrogen feed unit 102.

Subsequently, methylcyclohexane as preheated is transported to the vaporizer 106 mounted to an exhaust pipe from the engine 101. Also, exhaust gases from the engine 101 are transported to the vaporizer 106 through the hydrogen feed unit 102 arranged upstream as viewed from the engine 101.

Heat exchange is performed by a temperature difference between the both media transported to the vaporizer 106. Methylcyclohexane preheated to room temperature or higher is further heated in the vaporizer 106 to change into a vapor phase state. Methylcyclohexane as vaporized is transported to the hydrogen feed unit 102 to generate hydrogen owing to dehydrogenation.

Hydrogen gases as generated are transported to the engine 101 by the pump 109 to serve as a fuel to drive the engine 101. At this time, a quantity of hydrogen gases needed for the engine 101 is determined according to the operating state of the engine 101, that is, according to engine estimated torque and engine speed. Based on the quantity, the respective pumps 107, 108, 109 are controlled by an electronic controller (not shown).

As described above, making use of the quantity of heat obtained from high temperature exhaust gases discharged from and immediately after the engine 101, the hydrogen feed unit 102 generates hydrogen, so that it is possible to obtain a large amount of hydrogen as generated.

Subsequently, an effect in case of using a preheater will be described on the basis of calculation of thermal balance.

Assuming that temperature T1 of toluene charged into the preheater is 250° C., temperature T2 of toluene discharged from the preheater is 100° C., temperature t1 of methylcyclohexane charged into the preheater is 25° C., specific heat capacity $C_{pt}$ of toluene is 1.85 kJ/kgK, specific heat capacity $C_{pm}$ of methylcyclohexane is 1.84 kJ/kgK, and heat exchanger effectiveness is 45%, temperature t2 of methylcyclohexane discharged from the preheater is found from the following formula.

$$Gr \cdot C_{pg} \cdot (T1-T2) = Gr \cdot C_{pm}(t1-t2)$$

According to the calculation, temperature t2 of methylcyclohexane discharged from the preheater rises to 92.8° C. At this time, since methylcyclohexane has a boiling point of 100° C., methylcyclohexane is maintained in a liquid phase within the preheater. Thereafter, methylcyclohexane is charged into the vaporizer 106 to be vaporized through heat exchange with exhaust gases, which pass through the hydrogen feed unit 102.

A hydrogen feed unit described in JP-A-2005-147124 consumes a total heat quantity 100 kJ/mol of sensible heat, specific latent heat (32 kJ/mol), and dehydrogenation (endothermic reaction 68 kJ/mol) since methylcyclohexane in a liquid phase at room temperature is charged directly into the hydrogen feed unit. According to the embodiment, since exhaust heat of toluene and a quantity of exhaust gases after dehydrogenation are made use of for heat quantity of sensible heat and specific latent heat (32 kJ/mol), heat quantity charged into the hydrogen feed unit is increased by 32% and an amount of hydrogen as generated is correspondingly increased assuming that heat quantities charged into the hydrogen feed unit are the same.

Figure 2:
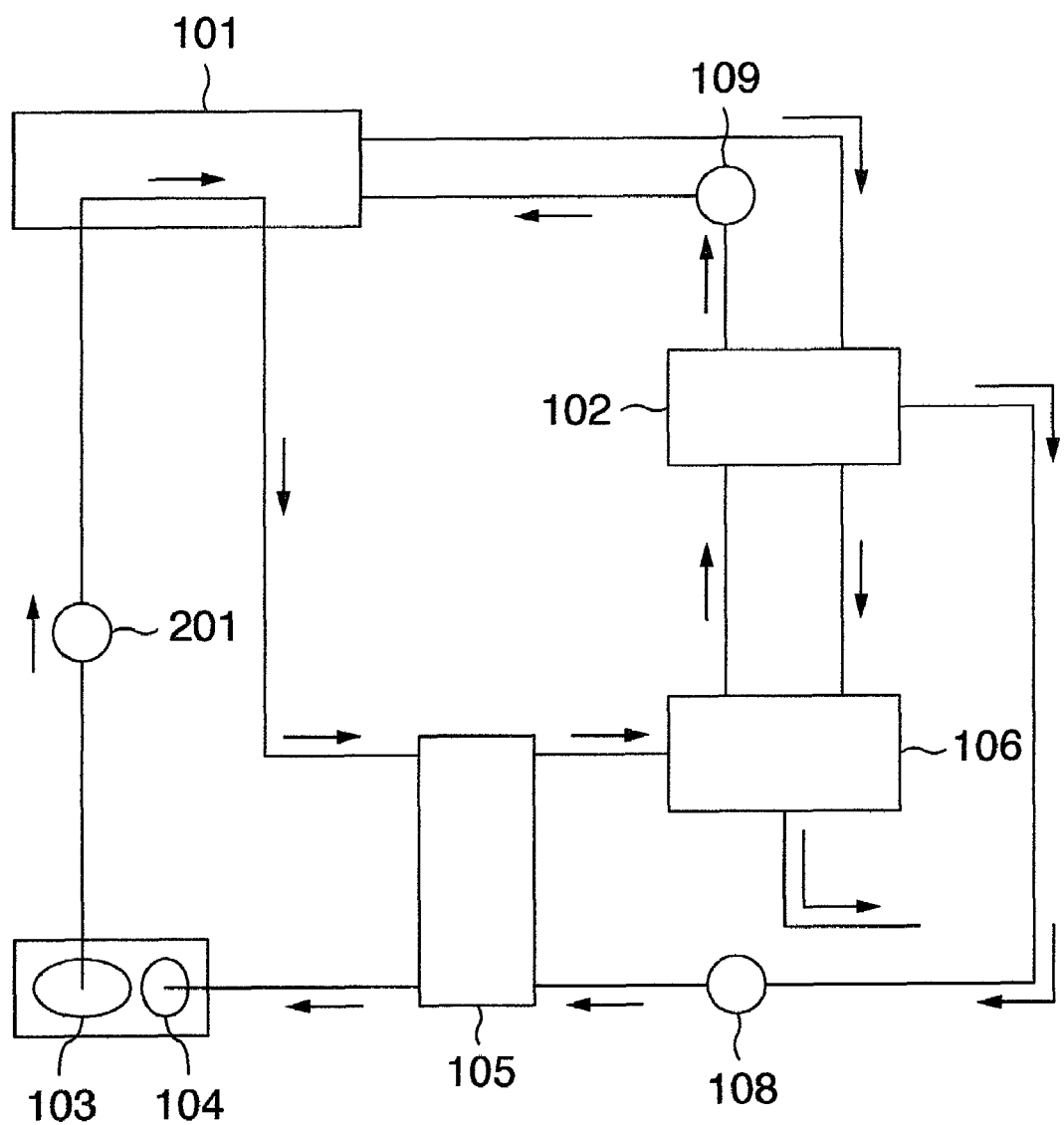
FIG. 2 is a block diagram of a hydrogen engine system according to another embodiment of the invention.

In a hydrogen engine system shown in FIG. 2, methylcyclohexane in a liquid phase at room temperature is transported to a water jacket (not shown) provided on a cylinder outer periphery of the engine 101 by a pump 201 before it is transported to the preheater 105 in the hydrogen engine system shown in FIG. 1.

Thereby, the engine 101 is cooled by methylcyclohexane and heat exchange at that time heats methylcyclohexane. Thereafter, methylcyclohexane as heated is transported to the preheater 105 to be further heated. When methylcyclohexane is transported to the hydrogen feed unit 102, it is fed in a state of higher temperature than that in the shown in FIG. 1 and so methylcyclohexane in a state of high temperature can be fed to the hydrogen feed unit 102, so that an increase in amount of hydrogen as generated is resulted.

Figure 3:
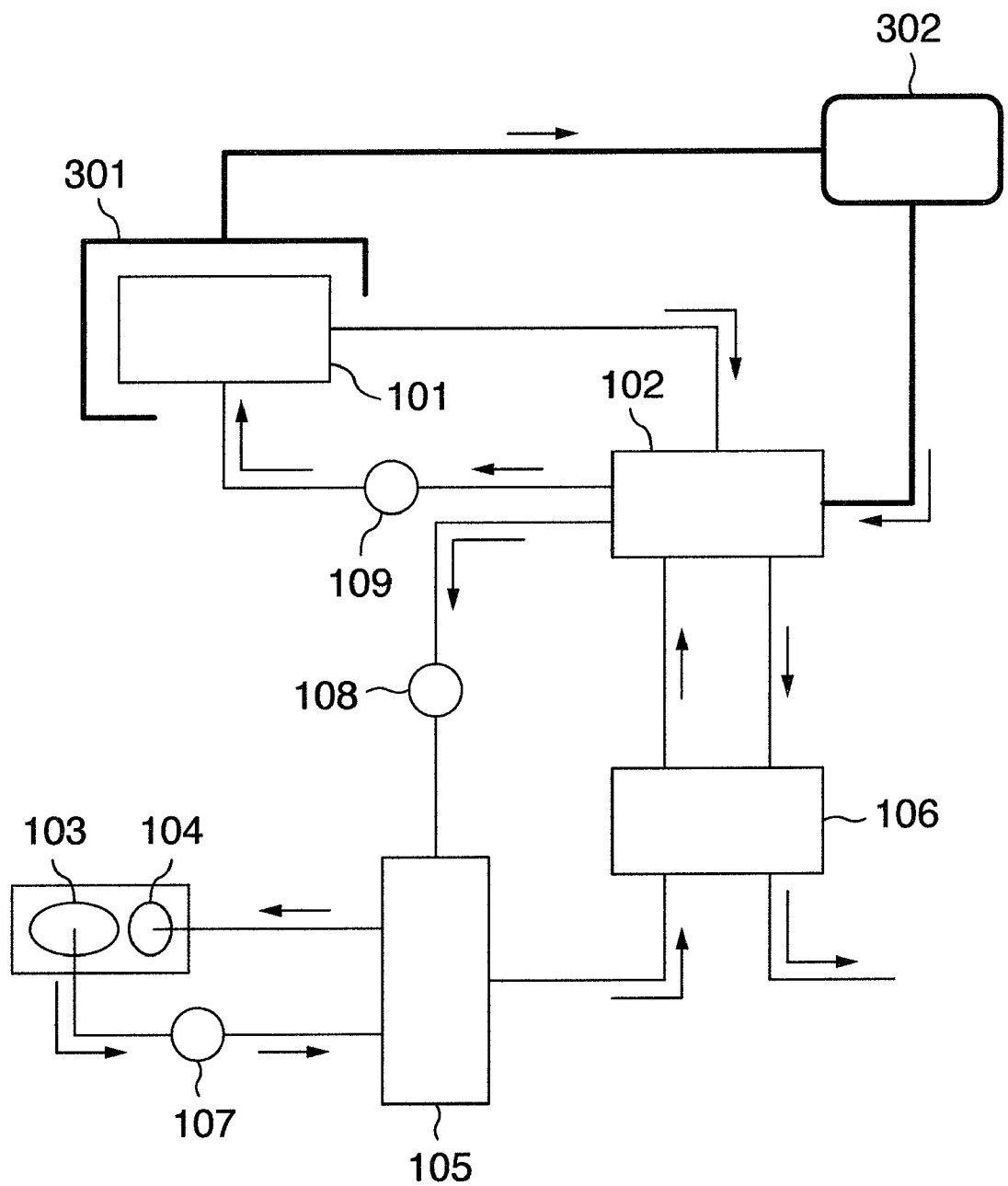
FIG. 3 is a block diagram of a hydrogen engine system according to a further embodiment of the invention.

In a hydrogen engine system shown in FIG. 3, a heat recovery plate 301 for recovery of heat discharged from an engine is arranged around an outer periphery of the engine 101, refrigerant is used to recover heat, and a heat pump 302 compresses the refrigerant to release high temperature heat to a hydrogen feed unit 102. At this time, aluminum, copper, or the like having a relatively high thermal conductivity is desirable as a material for the heat recovery plate 301. HFC134a, or the like is preferable for the refrigerant. Thereby, it is possible to give a larger quantity of heat to the hydrogen feed unit 102, so that generation of hydrogen is increased.

Figure 4:
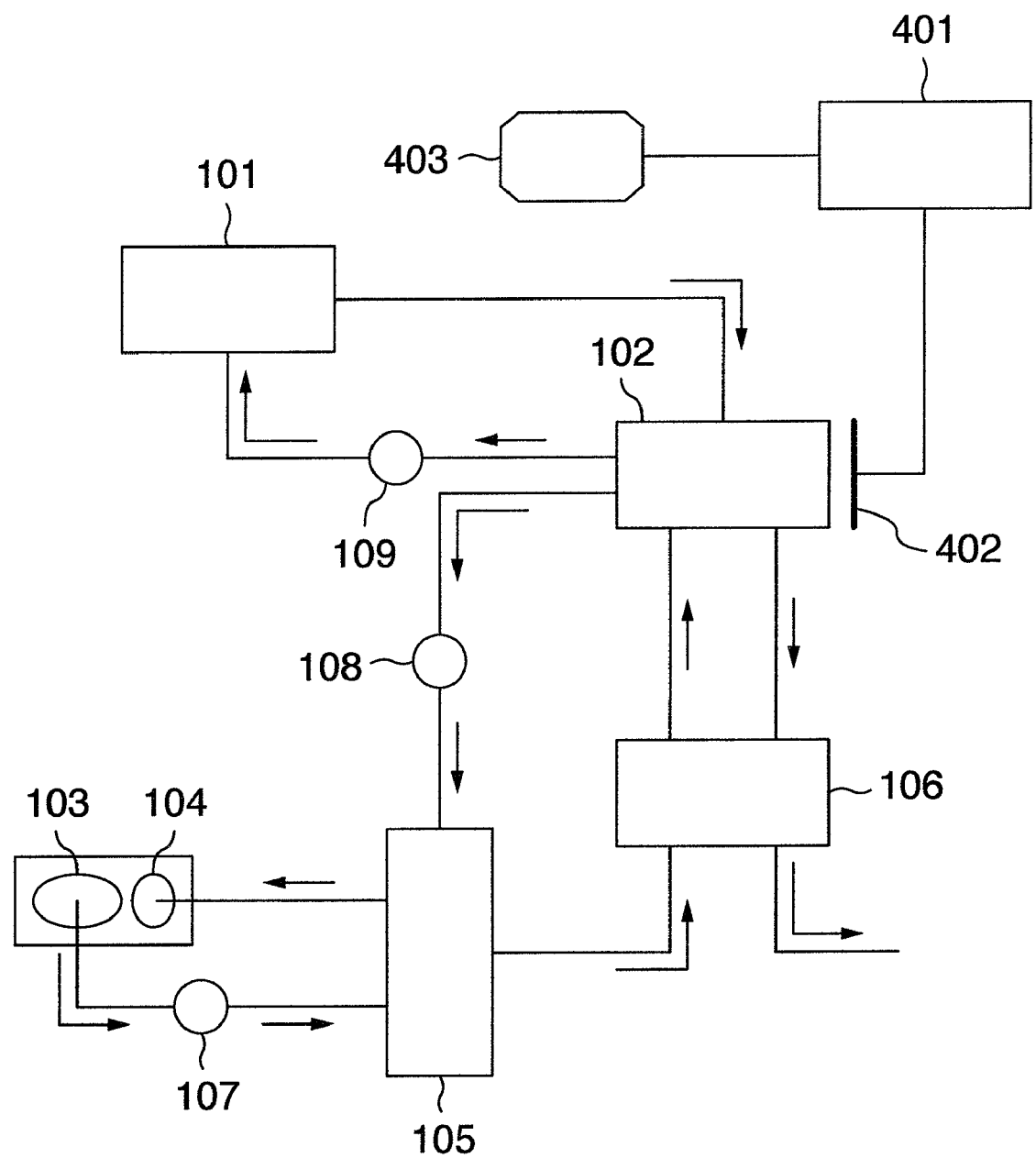
FIG. 4 is a block diagram of a hydrogen engine system according to a still further embodiment of the invention.

A hydrogen engine system shown in FIG. 4 comprises an engine system for automobiles to convert regenerative energy, which is generated at the time of automobile deceleration, into electric energy in the case where hydrogen is used as a fuel to drive an automobile, and is made an electric source for a heating heater 402 mounted to the hydrogen feed unit 102. That is, in an automobile with a regenerative brake, electricity generated by the regenerative brake 403 is stored in a battery 401 mounted on the automobile and the heating heater 402 mounted to the hydrogen feed unit 102 is operated at need on the basis of an amount of hydrogen gases needed for the engine according to the operating state of the engine, that is, engine estimated torque and engine speed. Thereby, it is possible to give a larger quantity of heat to the hydrogen feed unit 102, thus enabling an increase in amount of hydrogen as generated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A hydrogen engine system including a hydrogen feed unit, which generates hydrogen from organic hydride owing to dehydrogenation, and driving an engine with hydrogen gases as a fuel, the hydrogen engine system comprising:
   a hydrogenated liquid fuel tank, which holds a hydrogenated liquid fuel in a liquid phase;
   a preheater, to which the hydrogenated liquid fuel and a dehydrogenated fuel from the hydrogen feed unit are transported and which preheats the hydrogenated liquid fuel owing to heat exchange;
   an vaporizer, to which the hydrogenated liquid fuel as preheated by the preheater and exhaust gases of the engine are transported and which heats the hydrogenated liquid fuel to put the same in a vapor phase; and
   the hydrogen feed unit, to which the hydrogenated liquid fuel as vaporized by the vaporizer and the exhaust gases of the engine just after the engine are transported and which generates hydrogen gases owing to dehydrogenation to transport the same to the engine.

2. The hydrogen engine system according to claim 1, wherein the hydrogen feed unit is arranged upstream of exhaust gases from the engine and the vaporizer is arranged downstream of exhaust gases from the engine.

3. The hydrogen engine system according to claim 1, wherein the hydrogenated liquid fuel is transported to a water jacket provided on the engine before being transported to the preheater, and heated.

4. The hydrogen engine system according to claim 1, further comprising a heat recovery plate arranged on an outer periphery of the engine to recover released heat and to release heat to the hydrogen feed unit.

5. The hydrogen engine system according to claim 1, wherein said hydrogen engine system comprises an engine system for automobiles, and regenerative energy, which is generated at the time of automobile deceleration, is converted into electric energy and stored in a battery to heat the hydrogen feed unit.

6. The hydrogen engine system according to claim 1, wherein said hydrogen engine system comprises an engine system for automobiles, and regenerative energy, which is generated at the time of automobile deceleration, is e energy, which is generated at the time of automobile deceleration, is converted into electric energy and stored in a battery to heat the hydrogen feed unit in relation to an operating state of the engine.

7. A hydrogen engine system, comprising:
an engine in which hydrogen gas is used as fuel;
a hydrogenated liquid fuel tank which holds a hydrogenated liquid fuel in a liquid phase;
a hydrogen feed unit, which generates hydrogen gas and dehydrogenated fuel by dehydrogenation of vaporized hydrogenated liquid fuel using heat obtained by heat exchanging the vaporized hydrogenated liquid fuel and exhaust gases discharged from and immediately after the engine, and which provides the hydrogen gas as a fuel to the engine;
a preheater, to which the dehydrogenated fuel from the hydrogen feed unit and the hydrogenated liquid fuel are transported and which preheats the hydrogenated liquid fuel by heat exchange of the hydrogenated liquid fuel with the dehydrogenated fuel from the hydrogen feed unit; and
a vaporizer, to which the hydrogenated liquid fuel preheated by the preheater and exhaust gases of the engine are transported, which vaporizes the hydrogenated liquid fuel by heating the hydrogenated liquid fuel by heat exchange of the hydrogenated liquid fuel with the exhaust gases, and which provides the vaporized hydrogenated liquid fuel to the hydrogen feed unit.

8. The hydrogen engine system according to claim 7, further comprising a water jacket provided on the engine to which the hydrogenated liquid fuel is transported before being transported to the preheater, and in which the hydrogenated liquid fuel is heated.

9. The hydrogen engine system according to claim 7, further comprising a heat recovery plate arranged on an outer periphery of the engine to recover released heat and to release heat to the hydrogen feed unit.

10. The hydrogen engine system according to claim 7, wherein the hydrogen engine system is an engine system for an automobile, and the hydrogen engine system further comprises a regenerative brake for converting regenerative energy, which is generated at the time of automobile deceleration, into electric energy, a battery for storing the electric energy, and a heater using the electric energy stored in the battery for heating the hydrogen feed unit.

\* \* \* \* \*